United States Patent
Ferrucci et al.

(10) Patent No.: US 7,131,057 B1
(45) Date of Patent: Oct. 31, 2006

(54) METHOD AND SYSTEM FOR LOOSE COUPLING OF DOCUMENT AND DOMAIN KNOWLEDGE IN INTERACTIVE DOCUMENT CONFIGURATION

(75) Inventors: David Angelo Ferrucci, Yorktown Heights, NY (US); Steinar Flatland, Clifton Park, NY (US); Adam Patrick Lally, Troy, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,801

(22) Filed: Feb. 4, 2000

(51) Int. Cl.
*G06F 17/21* (2006.01)

(52) U.S. Cl. .................................. 715/501.1

(58) Field of Classification Search ............ 715/501.1, 715/515, 530, 531, 540, 301.1; 705/4; 717/106
See application file for complete search history.

(56) References Cited

U.S. PATENT DOCUMENTS

| | | | | |
|---|---|---|---|---|
| 5,267,155 | A | * | 11/1993 | Buchanan et al. .......... 715/540 |
| 5,313,394 | A | * | 5/1994 | Clapp .......................... 715/531 |
| 5,446,653 | A | * | 8/1995 | Miller et al. .................... 705/4 |
| 5,729,751 | A | * | 3/1998 | Schoolcraft ................. 715/530 |
| 6,182,095 | B1 | * | 1/2001 | Leymaster et al. .......... 715/515 |
| 6,473,892 | B1 | * | 10/2002 | Porter .......................... 717/106 |
| 2001/0044813 | A1 | * | 11/2001 | Frank ........................... 707/530 |

* cited by examiner

*Primary Examiner*—Doug Hutton
(74) *Attorney, Agent, or Firm*—Stephen C. Kaufman, Esq.; McGinn IP Law Group, PLLC

(57) ABSTRACT

A system (and method) for assembly process includes rendering document knowledge as textual components with variable fields, building an object-oriented domain model including domain knowledge, and linking the document knowledge to the domain knowledge.

4 Claims, 3 Drawing Sheets

METHOD AND SYSTEM FOR LOOSE COUPLING OF DOCUMENT AND DOMAIN KNOWLEDGE IN INTERACTIVE DOCUMENT CONFIGURATION

CROSS-REFERENCE TO RELATED APPLICATIONS

The present application is related to U.S. patent application Ser. No. 09/497,802, filed on Feb. 4, 2004, to Ferrucci et al., entitled "METHOD AND SYSTEM FOR INTERACTIVE DOCUMENT CONFIGURATION" having IBM, U.S. patent application Ser. No. 09/498,000, filed on Feb. 4, 2004, to Ferrucci et al., entitled "METHOD AND VISUAL APPARATUS FOR PRESENTING AND NAVIGATING A VARIABLE OBJECT MODEL", having IBM, and to U.S. patent application Ser. No. 09/497,800 filed on Feb. 4, 2004, to Ferrucci et al., entitled "METHOD AND SYSTEM FOR DOCUMENT COMPONENT IMPORTATION AND RECONCILIATION" having IBM, each in their entirety incorporated herein by reference.

BACKGROUND OF THE INVENTION

1. Field of the Invention

The present invention generally relates to a method and system for loose coupling (e.g., linking) domain and document components, and more specifically to a method and system for dynamic binding of document and domain knowledge during an interactive document assembly configuration session.

2. Description of the Related Art

Conventional document assembly systems represent documents as collections of paragraphs of text or "document components". Document assembly systems draw from a repository of these components. Given the answers to a series of questions, such systems select components from the repository and sequence them composing an initial draft of a completed document.

Document components may contain "Variable Text" (e.g., typically referred to as "variables"). Variables are represented within a document component by a particular word or phrase, typically referred to as a "field". The document assembly systems may assign different values to a variable depending on answers to the initial set of questions.

Document components refer to elements of some domain model. For example, in the case of a loan agreement, the loan document refers to the name and address of the lender or the amount of the loan. These elements make up a "domain model".

In conventional document assembly systems, domain knowledge is captured as answers to a collection of questions. These answers are used to select and assemble a series of document components. The series of questions and their answers are not organized as an object model, and hence has no structure or depth.

As is well-known, object modeling is a technique for modeling software systems and is often used to model the domain about which software systems or other abstract systems are written. In an object model a domain is broken down into discrete entities called "objects". Objects, in turn, possess "attributes" that represent properties of the object. An object model is a formal, symbolic representation of the objects in a domain, and the relationships between those objects. An object model diagram is any visual representation of an object model (e.g., a tree, a graph or more specifically a Unified Modeling Language (UML) diagram, etc.). Reusable subsets of an object model representing a domain are called "domain components". Most typically, a domain component contains a single object and its properties.

Thus, domain components are symbolic encodings of entities and their attributes/properties, about which a document component is written (e.g., things the document component's text or outline might refer to). These are typically represented as objects in an object-oriented programming language (e.g., JAVA™) or a mark-up language (e.g., XML).

In an interactive document assembly technique using an Integrated Interactive Document Configuration (IDC) system, as described in commonly-assigned Ser. No. 09/497,802 entitled "METHOD AND SYSTEM FOR INTERACTIVE DOCUMENT CONFIGURATION" incorporated herein by reference in its entirety, an object model is used to describe the domain elements that a document's text directly or indirectly refers to, the object model may be captured and linked to the document. This object model is called the document's "domain model".

Hitherto the present invention, the lack of an explicit mechanism for linking a document variable to an expression that facilitated reference to any element in an object model discourages the use of powerful object modeling techniques for independently representing the domain content of a document.

Without the loose coupling afforded by the separate but linked content model, it becomes difficult and time-consuming to ensure that variables of one component refer to the same domain element that other occurrences of that variable from other components (e.g., of the same assembly) refer. Hitherto the present invention, there has been neither method or system for allowing-such an advantage, nor the recognition that the lack of such loose coupling has been a problem.

SUMMARY OF THE INVENTION

In view of the foregoing and other problems, disadvantages, and drawbacks of conventional systems, it is, therefore, an object of the present invention to provide a structure and method for linking domain and document components such that a loose coupling between document and domain knowledge is established while also enabling the use of rich object modeling tools and techniques for representing a document's domain content.

Another object of the present invention develops a uniquely flexible mechanism for linking domain and document knowledge to support document assembly and interactive document configuration.

In a first aspect of the present invention, a method (and system) of linking domain knowledge to document knowledge, includes rendering document knowledge as textual components with variable fields, building an object-oriented domain model including domain knowledge, and linking the document knowledge to the domain knowledge.

In a second aspect of the invention, a system for linking domain components and document components, includes a domain object model including domain components, and a document object model linked to the domain object model.

In a third aspect of the invention, a signal-bearing medium storing the above method is provided.

With the unique and unobvious features of the invention, the present invention includes a way to represent the domain components independently of the document components and to link them together in the development tools to better support the creative human task. In addition to representing document components, the invention represents domain components.

Thus, the present invention is directed to a method and apparatus to link document and domain components and models. An important benefit of the dynamic aspect of document-to domain-linkage is that different elements of a domain model may be dynamically manipulated (e.g., deleted, inserted or replaced) during the interactive configuration of a document.

This loose coupling allows dynamic binding (e.g, the linking of domain and document components during interactive configuration) of document and domain components. It also enables powerful methods of automatic and semiautomatic variable reconciliation during component importation.

In a first embodiment of the present invention, the document variable is dynamically bound to a domain element. The binding can be changed at any time. If the domain element changes, then the value of associated document variables also change.

Furthermore, since domain models are represented by networks of related objects, changing a single domain element may cause entire portions of a domain model to be replaced. The linkage mechanisms enables all associated document variables to be automatically updated.

As mentioned above, conventional document assembly systems build a draft of a document from components and then stop.

In contrast, the method and system of the present invention enable tight integration between a word-processor and an integrated Interactive Document Configuration (IDC) system that allows a user to edit text as the user would in a regular word-processor while maintaining constant and dynamic access to information provided by the IDC system to help the user make choices for document sections and variables.

The inventive linkage between document component variables and domain model elements also advantageously allows reconciliation of variable(s) when importing source component(s) into a container. Without the loose coupling afforded by the separate but linked content-model of the present invention, it becomes difficult and time-consuming to ensure that variables of one component refer to the same domain element that other occurrences of that variable from other components (e.g., of the same assembly) refer.

Document-to-domain linkage ties variables in a document component to domain components forming a tight relationship between a document model and its domain (content) model. By changing elements of the content model, the document structure or text may automatically change.

Content variables in document components are linked to domain object properties by providing each content variable with an expression written in the domain model access language. If this expression evaluates to a domain object property, then the value of the document's content variable is linked to the value of the domain object property. The content variable will always display the value of the domain object property, and when the domain object property's value changes, the value displayed by the content variable will change as well.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
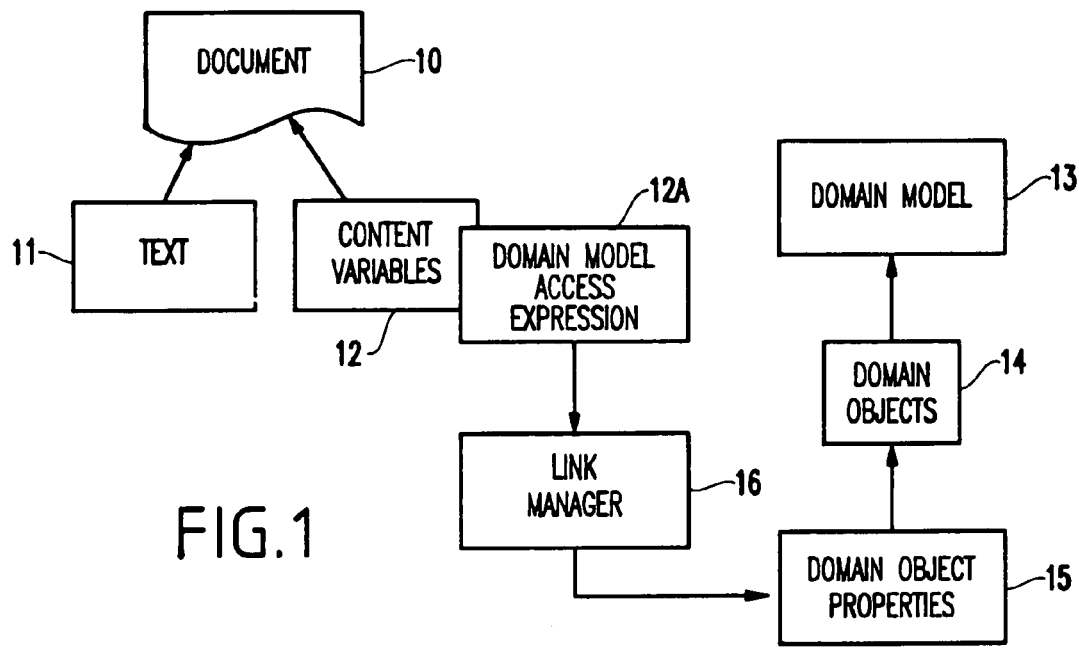
FIG. 1 is a flow diagram of the coupling between document components and domain objects according to the present invention.

Referring now to the drawings, and more particularly to FIGS. 1–5, there are shown preferred embodiments of the method and structures according to the present invention.

As mentioned above, the present invention dynamically binds document component variables to elements of a domain model during document configuration through an object model access expression. This independent and flexible, "loose coupling" of document and domain knowledge allow distinct domain models to be developed independently of any particular document. Furthermore, consistency of the document model is maintained based on the linking between document knowledge and domain knowledge. It is noted that for purposes of the present application, "loose coupling" means that domain model stands independently from the document and can be freely used to build templates for other documents. There is no "tight coupling". Thus, there is not a one-to-one correspondence between the number of documents and the number of domain models.

The domain models can be developed and imported from entirely different modeling efforts that have nothing to do with document production and then linked to any number of document components, enabling a new level of flexibility and reuse. Hence, many documents may be efficiently produced from one domain model.

For example, consider again a loan agreement, now intended to refer to the address of the borrower. Rather than encode the borrower and the borrower's address as part of the document component itself, a document variable is created that may be dynamically linked to some component of a domain model. This allows an independent domain model to be created including a representation of a borrower and properties of a borrower, such as a borrower's name, address, etc. The borrower and any properties of the borrower are considered domain elements.

FIG. 1 shows a high-level overview of a loose coupling of document components 10 and domain objects 14.

The document components 10 that comprise a document may contain, in addition to text 11, embedded text variables called "content variables" 12. Each content variable 12 may be assigned a domain object reference expression 12A.

Parallel to the document model, a domain model (e.g., domain object model) 13 is shown which includes domain objects 14. Each domain object 14 has domain object properties 15. The domain model reference expression (e.g., the same as "access" expression 12A) of a content variable 12 can be mapped (e.g., the domain model reference expression is written in a language with semantics defined such that an expression, when applied to a domain model, specifies a particular domain object property within that model) to some domain object property 15 within the domain model 13.

The value assigned to a content variable is linked (e.g., loosely coupled) to the value of the domain object property 15 that its domain model reference expression evaluates (e.g., maps) to. The content variable 12 and domain object property 15 will always have the same value (e.g., because they are linked). One of the consequences of a link between a content variable and domain object property is that they must always have the same value.

An entity called the link manager 16 is responsible for evaluating domain model reference expressions and enforcing the appropriate linkages between content variables 12 and domain object properties 15. The specific evaluation process is implementation dependent. The link manager must be able to interpret a domain object reference expression's semantics and determine the object property that the expression indicates. This may be accomplished in many ways depending on the particular syntax of the expression and how it is mapped to the model. It is a straight-forward exercise for any one skilled in the art. The linkages are "enforced" whenever a change occurs to: (A) a content variable's domain model reference expression, or (B) the domain model, the link manager will re-evaluate the domain model reference expression and establish the appropriate link.

The Link Manager 16 evaluates domain model access language expressions and manages the links between content variables and domain object properties accordingly. Whenever a new document component is imported into an assembly of components, the Link Manager 16 must evaluate the domain model access language expressions of all content variables in the new component and attach them to the appropriate properties in the container's domain model. For example, a document component representing a mailing address is imported into a template for a business letter. This document component has content variables representing the street, city, and state. In the container's domain model, values are defined for the recipient's address information. When the importation occurs, the link manager determines that the content variables in the address component correspond to the values in the container's domain model, and links them. Thus, when the importation completes, the address section of the letter displays the proper information for the recipient's address.

The Link Manager must also re-evaluate all domain model access language expressions whenever the domain model is reorganized. The Link Manager is solely responsible for linking the domain model to the document model.

Figure 2:
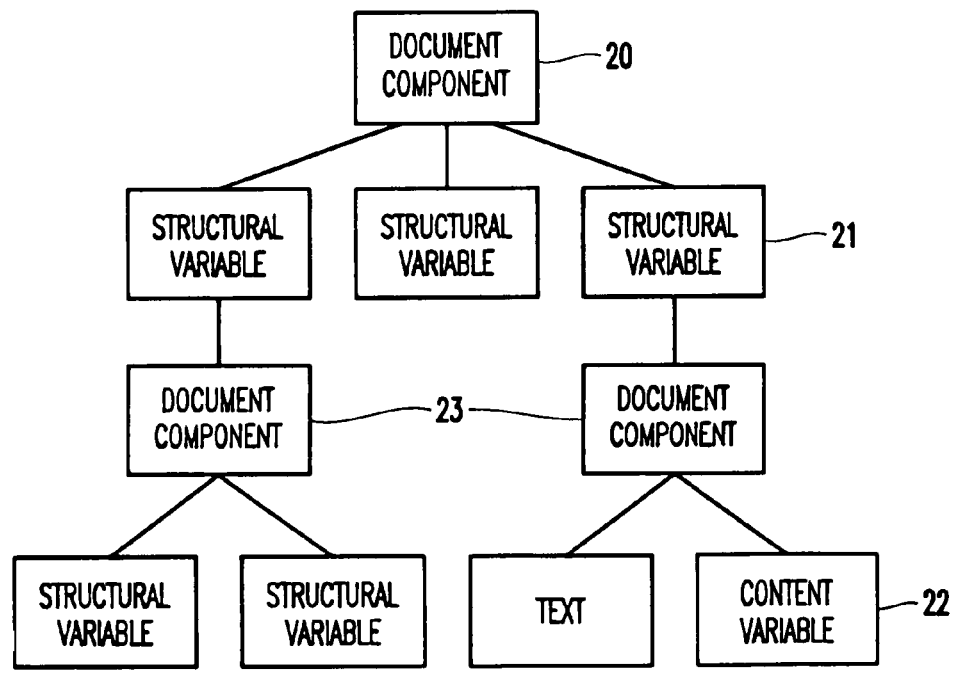
FIG. 2 is a composition diagram showing the structure of a document component according to the present invention.

FIG. 2 shows a document object model in which a document is composed of many pieces called "document components" 20. In addition to plain text, a document component 20 may contain a plurality of types of variables. For example, two types of variables are "structural variables" 21 and "content variables" 22.

Structural variables 21 have other document components 23 as values. These components 23 are the same type of thing as the document components 20 but one is contained in ("part-of") the other. They are not the identical components. They can be related as parent-child, etc. Parent-child is appropriate provided that the parent-child relationship is intended to represent the notion of containment. This structure permits a large document to be constructed from multiple, hierarchically-connected document components.

Content variables 22 in the document model have primitive values, such as strings. The content variables 22 in a document component 23 are linked to properties of domain objects in the domain model, as described in further detail below.

Figure 3:
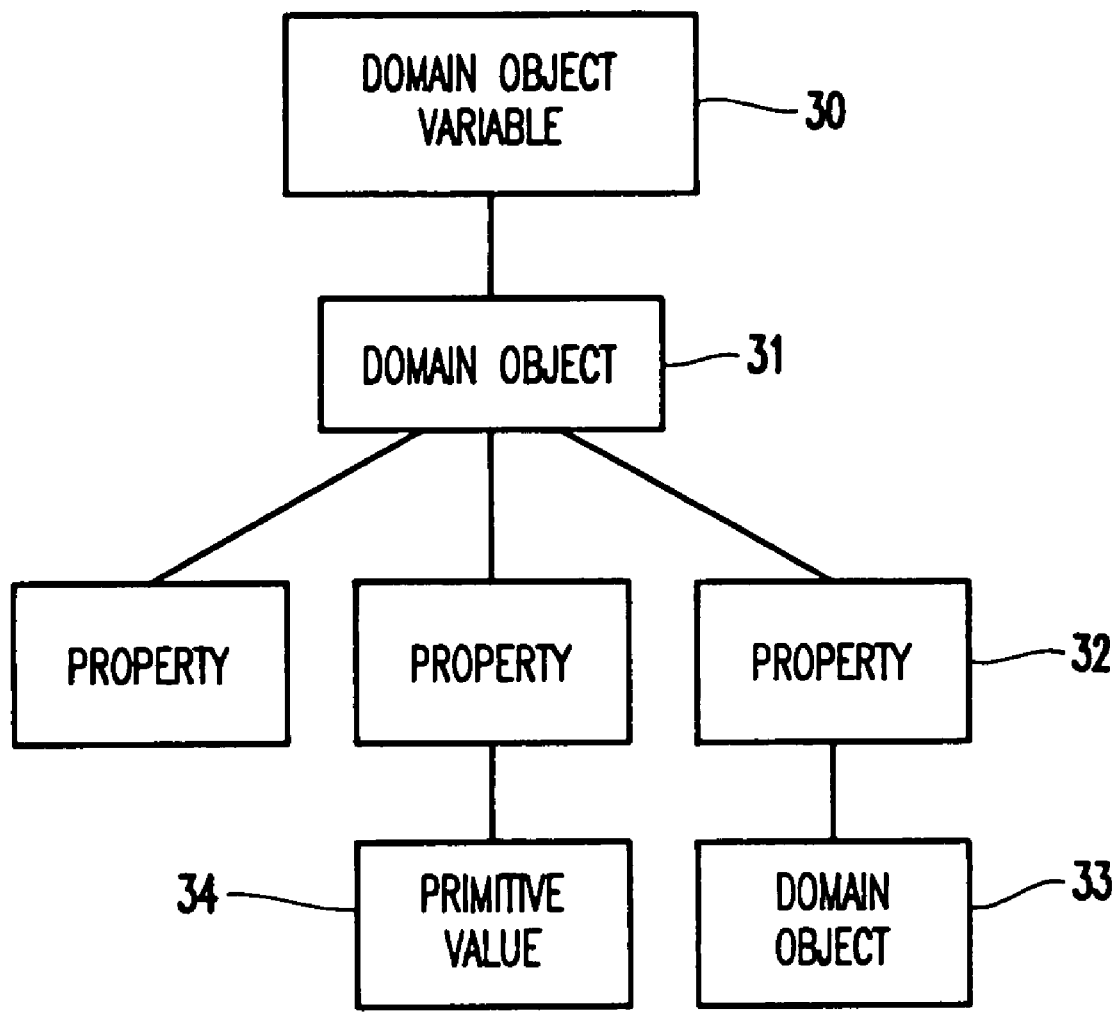
FIG. 3 is a composition diagram showing the structure of a domain object model according to the present invention.

Referring to FIG. 3, a top-level domain object model is shown. At the highest level is a domain object variable 30. A template may contain any number (e.g., zero or more) of domain object variables 30. A domain object variable 30 may have as its value a domain object 31, which is a construct that represents a discrete entity in the domain.

A domain object 31 has zero or more "properties" 32. However, an example of an object having zero properties would have little value. That is, objects are descriptions of things. A description of something without any properties has little of any utility. A car may be an object, but have no properties for the car specified. While this is technically allowed, it would be of no value. Each property 32 may have a value. That is, it is possible for a property to not have a value. However, in that case, the property's value is undefined. During interactive configuration, a user could supply a value. The value of a property 32 may be a primitive value 33, such as a text string, or it may be another domain object 34. The domain object 34 may in turn have its own properties, which have values, and so on.

An example of a simple domain object is the object adam_lally, which represents the real-world person Adam Lally.

This object might have the following properties: first_name, last_name, and employer. The first_name property would have the primitive value Adam, the last_name property would have the primitive value Lally, and the employer property would have as its value the object lks, which is a domain object that represents the company Legal Knowledge Systems. The lks object would then have properties such as name, employees, board of directors, and so on.

To loosely couple document content variables to domain object properties, a language for selecting a specific property from the domain object model is disclosed and is a preferred language/embodiment for the present invention.

This language is referred to as the domain model access language. This access language requires that a string in the language, when evaluated with respect to a domain object model, specify a domain object property. There are many possible implementations of this access language. The preferred implementation of a language for selecting a specific property from the domain object model is called the "object representation and access language" (ORAL). The syntax of ORAL is as follows:

<ORALExpression>::=<Identifier>|<Identifier>"("
<ORALExpression ")"
<Identifier>::=[_A-Za-z0-9]+

The semantics of ORAL can be explained by four rules. First, if an ORAL Expression consists of just a single identifier, that identifier names a domain object variable. The ORAL Expression is said to "evaluate to that domain object variable".

Secondly, if an ORAL Expression consists of an identifier pre-appended to another ORAL Expression, and the nested ORAL Expression evaluates to a variable or property that has a domain object as its value, then the pre-appended identifier names a property of that domain object, and the ORAL Expression is said to evaluate to that property.

Thirdly, if an ORAL Expression consists of an identifier pre-appended to another ORAL Expression, and the nested ORAL Expression does not evaluate to a variable or property that has a domain object as its value, the ORAL Expression does not evaluate to anything.

Fourthly, if at any level of the ORAL Expression an identifier does not name a valid domain object variable or property, the ORAL Expression does not evaluate to anything.

In an illustrative example, consider the domain object variable called inventor, which has as its value the object adam_lally described earlier. The ORAL Expression first_name (inventor) would evaluate to the first_name property of the adam_lally object. The ORAL Expression name (employer (inventor)) would evaluate to the name property of the lks object.

While the preferred embodiment of an object model access language, for referring to domain model elements, is ORAL as described above, the object access language may be one of many depending on the embodiment of the object model (e.g., SQL, KQML, etc.).

Thus, with the unique and unobvious aspects of the present invention, the variables in a document are loosely coupled to (e.g., refer to) actual elements in the domain model. Hence, for example, if rules and constraints are tailored or developed to maintain consistency of the domain model, then there will be a direct impact on the document model since the variables in the document model actually refer to items (e.g., variables) in the domain model (e.g., content model). It is noted that the elements in the domain model may or may not (e.g., need not) appear in the document model. However, clearly the elements in the domain model influence what appears in the document.

For example, in a domain and document model, a customer has a name and a name property, as alluded to in the example above. The domain model can be built defining what is an entity (e.g., a customer, a project, a phase, etc.), and rules and/or constraints can be built for describing the valid configurations without even considering the constructions of documents.

Then, a group of documents (e.g., a customer letter, a macro design phase description, a solution outline, a high-level design, etc.) each referring to the same domain model, can be taken. To begin constructing (e.g., engineering) the document, the elements (variables) of the domain model simply can be taken and inserted into the documents.

Thus, the loose coupling concept allows the model designer to build a series of documents easily and quickly, unlike the conventional document assembly systems which do not have an explicit domain model and in which a series of questions (e.g., forming a template) are answered in a vacuum and then inserted at the appropriate places in the specific document. In the conventional system, the answers to the questions are an implicit domain model, but the answers are only for one specific document. Thus, a number of domain models would have to be built corresponding to the number of documents to be constructed. In contrast, with the present invention, multiple documents can be built from a single domain model. Thus, the conventional methods and systems result in extreme inefficiency and lack of reusability of resources.

Thus, the invention can build a highly-structured, object-oriented explicit domain model independent of any document to be produced. The domain model constructed with the invention can be used for any of a plurality of documents given that the consistency of the document model is maintained since there is a "coupling" between the document model and the domain model. The template and questions answered in the conventional (implicit) domain model are useful only for a single document. To prepare another form, another set of questions must be answered in the conventional systems Indeed, it is not even clear how the questions answered even relate to items in another form/document. In contrast, with the invention, once the model is built, many documents can be configured from the model. Thus, the model according to the method and system of the invention can stand on its own, and has its own modeling methodology, and is a robust, explicit, and formal representation of the domain problem (e.g., "what is a customer", "what is a project", "who is the vendor", "what is the vendor's address", etc.). Then, the domain model can be linked to elements of the document(s) and the document can refer to elements of this model. Thus, for example, a question and answer form (e.g., such as in a template) can be easily and automatically generated.

Hence, the domain model is built separate and independent from a document, thereby allowing its reusability and applicability to another array of documents.

Figure 4:
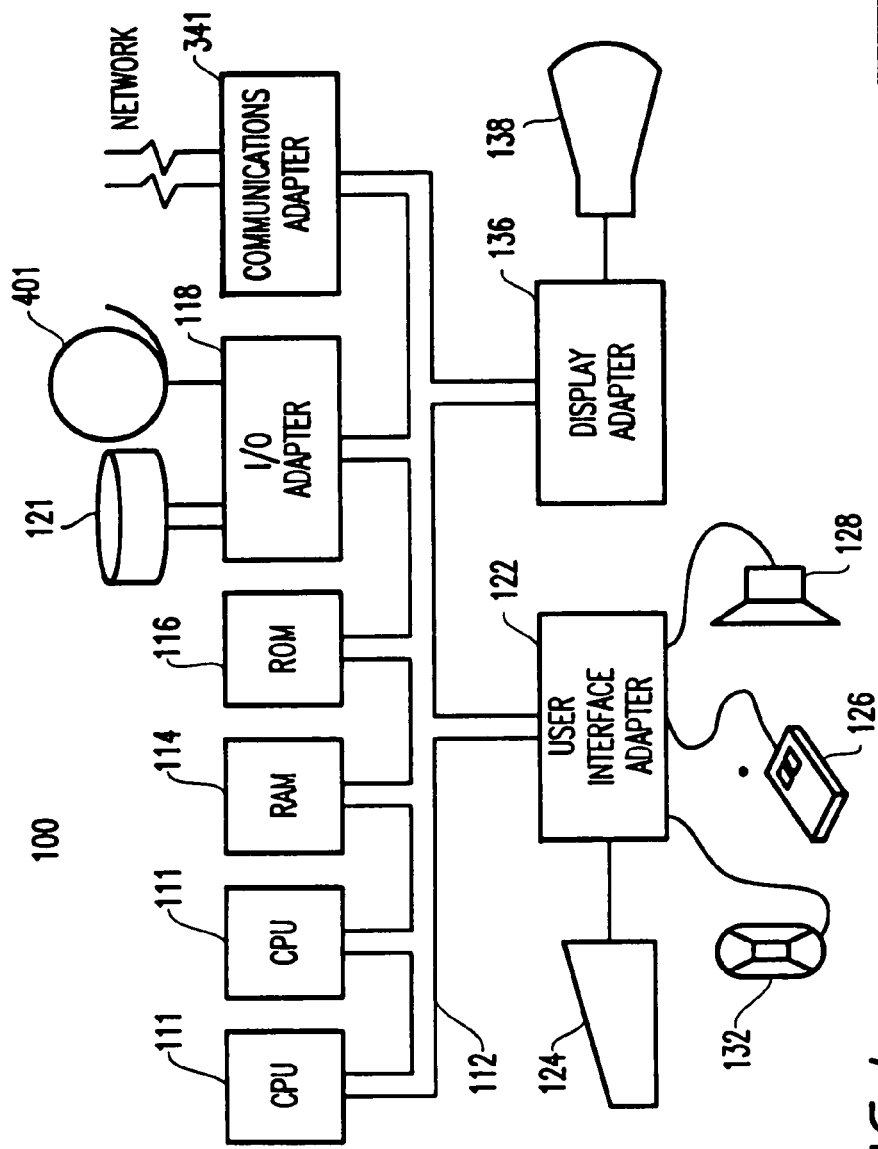
FIG. 4 illustrates a block diagram of the environment and configuration of an exemplary hardware/information handling system 100 for implementing the system and method according to the present invention.

As shown in FIG. 4, a typical hardware configuration of an information handling/computer system for use in implementing or for use with the invention preferably has at least one processor or central processing unit (CPU) 111. The CPUs 111 are interconnected via a system bus 112 to a random access memory (RAM) 114, read-only memory (ROM) 116, input/output (I/O) adapter 118 (for connecting peripheral devices such as disk units 121 and tape drives 401 to the bus 112), user interface adapter 122 (for connecting a keyboard 124, mouse 126, speaker 128, microphone 132, and/or other user interface device to the bus 112), communication adapter 341 (for connecting an information handling system to a data processing network), and display adapter 136 (for connecting the bus 112 to a display device 138).

Figure 5:
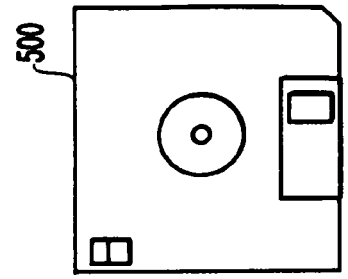
FIG. 5 illustrates a storage medium 500 for storing steps of the program for loosely coupling document and domain knowledge in interactive document configuration.

As shown in FIG. 5, in addition to the hardware and process environment described above, a different aspect of the invention includes a computer-implemented method for loosely coupling document and domain knowledge during the automatic or assisted generation of documents. As an example, this method may be implemented in the particular hardware environment discussed above.

Such a method may be implemented, for example, by operating the CPU 111 (FIG. 4), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 111 and hardware above, to loosely coupled the document knowledge and domain knowledge.

This signal-bearing media may include, for example, RAM (not shown) contained within the CPU 111, as represented by the fast-access storage for example. Alternatively, the instructions may be contained in another signal-bearing media, such as a magnetic data storage diskette 500 (FIG. 5), directly or indirectly accessible by the CPU 111.

Whether contained in the diskette 500, the computer/CPU 111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

What is claimed is:

1. A method of linking domain knowledge to document knowledge, comprising:
   rendering document knowledge as textual components with variable fields;
   building an object-oriented domain model comprising domain knowledge, wherein said building an object-oriented domain model comprises organizing data input by a user into said domain model;
   linking said document knowledge to said domain knowledge, by linking said domain knowledge to document knowledge variables, said domain knowledge comprising domain knowledge elements, and said domain knowledge elements are dynamically linked to said document knowledge variables through an object model access expression; and
   re-evaluating the object model access expression of each of said document knowledge variables whenever the domain model is reorganized,
   wherein said document knowledge variables are linked to said domain knowledge elements by selecting specific properties from the domain model by an object representation and access language,
   wherein said object representation and access language (ORAL) comprises a plurality of ORAL expressions, and
   wherein if a first ORAL expression of said plurality of ORAL expressions comprises a single identifier, ten the first ORAL expression corresponds to a domain knowledge element.

2. A method of linking domain knowledge to document knowledge, comprising:
   rendering document knowledge as textual components with variable fields;
   building an object-oriented domain model comprising domain knowledge, wherein said building an object-oriented domain model comprises organizing data input by a user into said domain model;
   linking said document knowledge to said domain knowledge, by linking said domain knowledge to document knowledge variables, said domain knowledge comprising domain knowledge elements, and said domain knowledge elements are dynamically linked to said document knowledge variables through an object model access expression; and
   re-evaluating the object model access expression of each of said document knowledge variables whenever the domain model is reorganized,
   wherein said document knowledge variables are linked to said domain knowledge elements by selecting specific properties from the domain model by an object representation and access language,
   wherein said object representation and access language (ORAL) comprises a plurality of ORAL expressions, and
   wherein if a first ORAL expression comprises an identifier pre-appended to a second ORAL expression and the second ORAL expression corresponds to a domain knowledge element, then the identifier corresponds to a property of the domain knowledge element and said first ORAL expression corresponds to the property of the domain knowledge element.

3. A method of linking domain knowledge to document knowledge, comprising:
   rendering document knowledge as textual components with variable fields;
   building an object-oriented domain model comprising domain knowledge, wherein said building an object-oriented domain model comprises organizing data input by a user into said domain model;
   linking said document knowledge to said domain knowledge, by linking said domain knowledge to document knowledge variables, said domain knowledge comprising domain knowledge elements, and said domain knowledge elements are dynamically linked to said document knowledge variables through an object model access expression; and
   re-evaluating the object model access expression of each of said document knowledge variables whenever the domain model is reorganized,
   wherein said document knowledge variables are linked to said domain knowledge elements by selecting specific properties from the domain model by an object representation and access language,
   wherein said object representation and access language (ORAL) comprises a plurality of ORAL expressions, and
   wherein if a first ORAL expression comprises an identifier pre-appended to a second ORAL expression and the second ORAL expression does not correspond to a domain knowledge element, then said first ORAL expression does not correspond to anything.

4. A method of linking domain knowledge to document knowledge, comprising:
   rendering document knowledge as textual components with variable fields;
   building an object-oriented domain model comprising domain knowledge, wherein said building an object-oriented domain model comprises organizing data input by a user into said domain model;
   linking said document knowledge to said domain knowledge, by linking said domain knowledge to document knowledge variables, said domain knowledge comprising domain knowledge elements, and said domain knowledge elements are dynamically linked to said document knowledge variables through an object model access expression; and
   re-evaluating the object model access expression of each of said document knowledge variables whenever the domain model is reorganized,
   wherein said document knowledge variables are linked to said domain knowledge elements by selecting specific properties from the domain model by an object representation and access language,
   wherein said object representation and access language (ORAL) comprises a plurality of ORAL expressions, and
   wherein if a first ORAL expression comprises an identifier and said identifier does not correspond to a domain knowledge element, then said first ORAL expression does not correspond to anything.

* * * * *